United States Patent
Stasik et al.

Patent Number: 5,873,281
Date of Patent: Feb. 23, 1999

[54] DOWNSHIFT CONTROL METHOD/SYSTEM FOR VEHICULAR AUTOMATED MECHANICAL TRANSMISSION

[75] Inventors: Anthony Stasik, Coppull; Michael Douglas Whitehead, Cheadle Hulme, both of England

[73] Assignee: Eaton Corporation, Cleveland, Ohio

[21] Appl. No.: 916,510

[22] Filed: Aug. 22, 1997

[30] Foreign Application Priority Data

Aug. 28, 1996 [GB] United Kingdom ............... 9617956

[51] Int. Cl.$^6$ ............................................. F16H 59/36
[52] U.S. Cl. ........................ 74/335; 74/336 R; 477/124
[58] Field of Search .......................... 74/335, 336 R; 477/123, 124

[56] References Cited

U.S. PATENT DOCUMENTS

| | | | |
|---|---|---|---|
| 4,361,060 | 11/1982 | Smyth | 477/78 |
| 4,648,290 | 3/1987 | Dunkley et al. | 74/866 |
| 4,722,248 | 2/1988 | Braun | 74/745 |
| 5,157,607 | 10/1992 | Stainton et al. | 701/62 |
| 5,261,288 | 11/1993 | Menig | 74/336 R X |
| 5,406,861 | 4/1995 | Steeby | 74/336 |
| 5,409,432 | 4/1995 | Steeby | 477/71 |
| 5,413,012 | 5/1995 | Davis | 74/335 |
| 5,441,463 | 8/1995 | Steeby | 74/336 R X |
| 5,441,464 | 8/1995 | Markyvech | 477/109 |
| 5,444,623 | 8/1995 | Genise | 74/336 R X |
| 5,537,894 | 7/1996 | Chan | 74/336 R X |
| 5,609,548 | 3/1997 | White et al. | 477/124 |
| 5,636,120 | 6/1997 | Yesel et al. | 74/335 X |

*Primary Examiner*—Charles A. Marmor
*Assistant Examiner*—Scott Lund
*Attorney, Agent, or Firm*—Howard D. Gordon

[57] ABSTRACT

A method and system for controlling downshifting of an automated mechanical transmission system which senses unsuccessful attempts to engage a predetermined downshift target gear ratio ($GR_T$) due to engine speed remaining less than the synchronous engine speed ($ES = OS*GR_T$) for engaging said target gear ratio and, in response to sensing such conditions, automatically initiates a degraded mode of operation wherein an achievable degraded mode target gear ratio ($GR_{DMT} < ES_{MAX} \div OS$), synchronizable at achieved maximum engine speed ($ES_{MAX}$), is identified and caused to be engaged.

8 Claims, 3 Drawing Sheets

DOWNSHIFT CONTROL METHOD/SYSTEM FOR VEHICULAR AUTOMATED MECHANICAL TRANSMISSION

BACKGROUND OF THE INVENTION

1. Field of the Invention

The present invention relates to a control method or system for controlling downshifting of an at least partially automated vehicular mechanical transmission. In particular, the present invention relates to a downshift control operating under logic rules which will sense a condition wherein the vehicle engine is unable to achieve an engine speed sufficient to allow synchronous engagement of the downshift target ratio and, in response thereto, will select the lowest speed ratio which can be synchronously engaged at the current vehicle conditions as a new, degraded mode target ratio.

2. Description of the Prior Art

Fully and partially automated vehicular mechanical transmission systems are known in the prior art, as may be seen by reference to U.S. Pat. Nos. 4,361,060; 4,595,986; 4,648,290; 4,722,248; 4,754,665; 5,406,861; 5,413,012; 5,441,463 and 5,441,464, the disclosures of which are incorporated herein by reference.

Such fully or partially automated vehicular mechanical transmission systems typically include a microprocessor-based controller for issuing command output signals to various controllers to implement selected transmission shifts, including manipulation of the engine fueling and/or engine or input shaft brakes to cause the transmission input shaft to rotate at a substantially synchronous speed for a given output shaft speed and target gear ratio. To accomplish a downshift in such a fully or partially automated mechanical transmission, the sequence of operations include automatic or manual selection of a downshift target ratio, disengagement of the currently engaged ratio, reengaging or retaining in the engaged condition the vehicle master clutch, causing the engine and, thus, the input shaft to rotate at a substantially synchronous speed for engaging the target gear ratio at current vehicle speed (usually as determined by output shaft speed) and, upon sensing attainment of synchronous speed, causing the jaw clutches associated with the target gear ratio to be engaged.

While the prior art fully or partially automated mechanical transmission systems are generally satisfactory, they are subject to improvement, as the systems tend to attempt to synchronize for engagement of a selected target gear ratio for an excessively long period of time under conditions wherein substantial synchronization could not be attained. Such conditions may include intentional or inadvertent application of full or partial engine braking, faulty engine fueling and/or control system communication and/or excessive vehicle speed and/or acceleration.

SUMMARY OF THE INVENTION

In accordance with the present invention, the drawbacks of the prior art are minimized or overcome by the provision of a downshift control system and method for fully or partially automated vehicular mechanical transmission systems wherein, upon initiation of a downshift into a target gear ratio, a timing sequence is initiated and parameters indicative of engine speed and vehicle speed are monitored. If after a predetermined period of time (for example, about 2.0 seconds) engine speed has failed to be increased to a substantially synchronous value for engagement of the target gear ratio under current vehicle operating conditions (ES=IS=OS*GR), then the control logic will enter a degraded mode of operation wherein a degraded mode target gear ratio is selected as the new target gear ratio. The new degraded mode target gear ratio ($GR_{DMT}$) is selected such that, under current vehicle speed, it is the lowest ratio for which synchronous can be attained at the highest engine speed noted during the previous unsuccessful attempt to engage the original target gear ratio. Upon selection of the new target gear ratio, the usual synchronization and then engagement sequence of operations is initiated and, hopefully, completed. The operator may be informed of a fault and of operation in a degraded mode and/or such declaration of a fault may occur only after a predetermined number of unsuccessful attempts to engage an initial downshift target gear ratio.

The foregoing is accomplished by the provision of logic rules for the system controller which will time attempts to complete a downshift and will monitor and memorize sensed engine speeds during attempts to accomplish a downshift. If the downshift remains unaccomplished at the expiration of the predetermined period of time due to the engine speed remaining less than the required synchronous engine speed, a new degraded mode downshift target ratio is selected based upon the highest sensed engine speed ($ES_{MAX}$) during the previous unsuccessful attempt to engage the original target gear ratio and the current output shaft speed.

Accordingly, it is an object of the present invention to provide a new and improved downshift control method and system for vehicular automated mechanical transmissions which, in the event of an unsuccessful attempt to engage a target downshift gear ratio, will select and cause the engagement of a new degraded mode downshift target gear ratio which is attainable at such engine and output shaft speeds.

This and other objects and advantages of the present invention will become apparent from a reading of the following description of the preferred embodiment taken in connection with the attached drawings.

DESCRIPTION OF THE PREFERRED EMBODIMENT

The term "mechanical transmission" is used to designate a change-speed or change-gear transmission having a plurality of selectable gear ratios between the input and output shafts thereof, which may be selectively engaged and disengaged by the selective engagement and disengagement of positive jaw clutches. The term "downshift" as used herein shall mean the shifting from a higher speed gear ratio to a lower speed gear ratio. As is known, a lower speed gear ratio (such as 8th speed) will have a higher numerical value than a higher gear ratio (such as 9th speed). Downshifting includes a downshift by a single ratio, such as a 9th-speed-to-8th-speed downshift, and skip downshifting, such as a direct shift from 10th speed to 8th speed.

Figure 1:
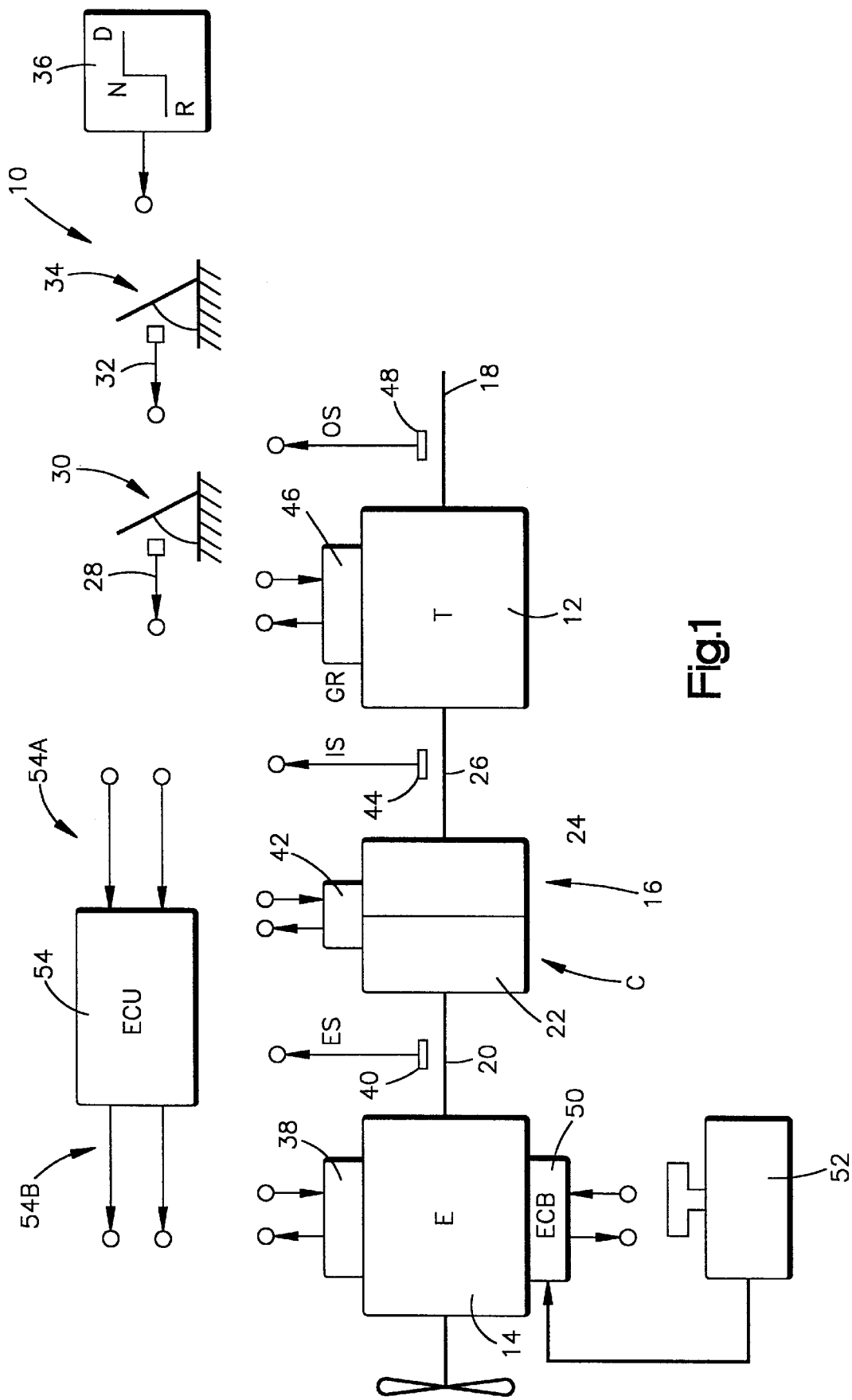
FIG. 1 is a schematic illustration of an automated mechanical transmission system of the type particularly well suited to be controlled by the control method/system of the present invention.

FIG. 1 schematically illustrates a vehicular automated mechanical transmission system 10 including an automated multiple-speed, change-gear transmission 12 driven by a fuel-controlled engine 14, such as a well-known diesel engine, through a non-positive coupling such as a master friction clutch 16. The output of the automated transmission 12 is output shaft 18, which is adapted for driving connection to an appropriate vehicle component such as the differential of a drive axle, a transfer case or the like.

The crankshaft 20 of engine 14 will drive the driving plates 22 of the master friction clutch 16, which are frictionally engageable to driven plates 24 for driving the input shaft 26 of transmission 12.

The aforementioned powertrain components are acted upon, monitored by and/or controlled by several devices, each of which will be discussed briefly below. These devices include a throttle pedal position or throttle opening monitor assembly 28, which senses the operator-set position of the operator-controlled throttle device 30, a brake-applied monitor assembly 32 which senses operator operation of a brake pedal 34, and a shift control monitor assembly 36 by which the operator may select a reverse (R), neutral (N) or forward drive (D) mode of operation of the vehicle. Other types of shift control devices may be used, such as the up and down pulser illustrated in aforementioned U.S. Pat. No. 4,648,290 and/or the shift control device illustrated in U.S. Pat. No. 5,441,463, the disclosure of which is incorporated herein by reference.

The devices also may include a fuel control device 38 for controlling the amount of fuel to be supplied to engine 14, an engine speed sensor 40 which senses rotational speed (ES) of the engine, a clutch operator 42 which engages and disengages master clutch 16, which also may provide information as to the status of the clutch, an input shaft speed sensor 44 for sensing the rotational speed (IS) of transmission input shaft 26, a transmission operator 46, which is effective to shift the transmission 12 into a selected gear ratio and/or to provide a signal indicative of a gear neutral and/or of the currently engaged gear ratio of the transmission, and an output shaft speed sensor 48 for sensing the rotational speed (OS) of output shaft 18.

An engine brake 50 may be provided for selectively retarding the rotational speed of the engine 14 under the control of a manually operated engine brake operator 52, usually in the vehicle cab, allowing the operator to selectively apply the engine brake. Preferably, the engine 14 is electronically controlled and is equipped to provide information on and to receive information from an electronic data link conforming to a known protocol, such as SAE J1922 or SAE J1939 or ISO 11898.

The sensors may be of any known type of construction for generating analog and/or digital signals proportional to the control parameter monitored thereby. Similarly, the operators may be of any known electric, hydraulic, pneumatic or combination type for executing operations in response to command output signals. The aforementioned devices supply information to and/or accept command output signals from a central processing unit or control 54. The central processing unit 54 may include analog and/or digital electronic calculation and logic circuitry, as is well known in the prior art. An electrical power source (not shown) and/or a source of pressurized fluid (not shown) provides electrical and/or fluid power to various sensing and/or operating and/or processing units.

In addition to direct inputs, the central processing unit 54 may be provided with circuits for differentiating input signals from the various sensors to provide a calculated signal indicative of the rates of change thereof. As is known and as disclosed in aforementioned U.S. Pat. No. 4,595,986, central processing unit 54 is adapted to receive various input signals 54A from the sensors and to process same according to predetermined logic rules to issue command output signals 54B to the appropriate system actuators.

In fully or partially automated mechanical transmission systems of the type illustrated in FIG. 1, synchronization of the jaw clutch members associated with engagement of a target gear ratio is normally accomplished by selectively increasing or decreasing engine speed, with the master clutch engaged, to cause the input shaft to rotate at a speed generally equal to the product of the output shaft speed and the numerical value of the target gear ratio (i.e., ES=IS= OS*GR). For downshifts, where input shaft speed must generally be increased, increased fueling of the engine will provide the desired increase in engine speed.

Upon manual or automatic selection of an allowable downshift, i.e., a downshift into a target gear ratio ($GR_T$), wherein the product of the numerical value of the gear ratio and the output shaft speed will not exceed a maximum allowable engine speed, implementation of the downshift is normally accomplished in a sequence involving disengagement of the currently engaged gear ratio, which may involve disengagement of the master clutch and/or manipulation of engine fueling, reengagement and/or maintaining engaged the master friction clutch, increasing engine fueling to cause the engine to rotate at a substantially synchronous speed for engaging the target gear ratio under current vehicle operating conditions and, upon sensing synchronous conditions, commanding that the jaw clutches associated with the target gear ratio be brought into positive engagement.

Under certain conditions, the vehicle engine may not accelerate sufficiently to cause the engine speed to reach a substantially synchronous value for engagement of the target gear ratio. Such conditions may involve deliberate or inadvertent application of the vehicle engine brake, a fault in the engine controller or engine fuel supply and/or excessive acceleration of the vehicle. According to the present invention, a control method and system is provided which will sense such conditions and will automatically initiate a degraded mode of operation wherein a new downshift target gear ratio, a degraded mode downshift target gear ratio ($GR_{DMT}$), is selected such that the new ratio is the lowest available gear ratio which may be successfully synchronized at the highest sensed engine speed sensed during attempts to synchronize for the original downshift target gear ratio.

Figure 2A:
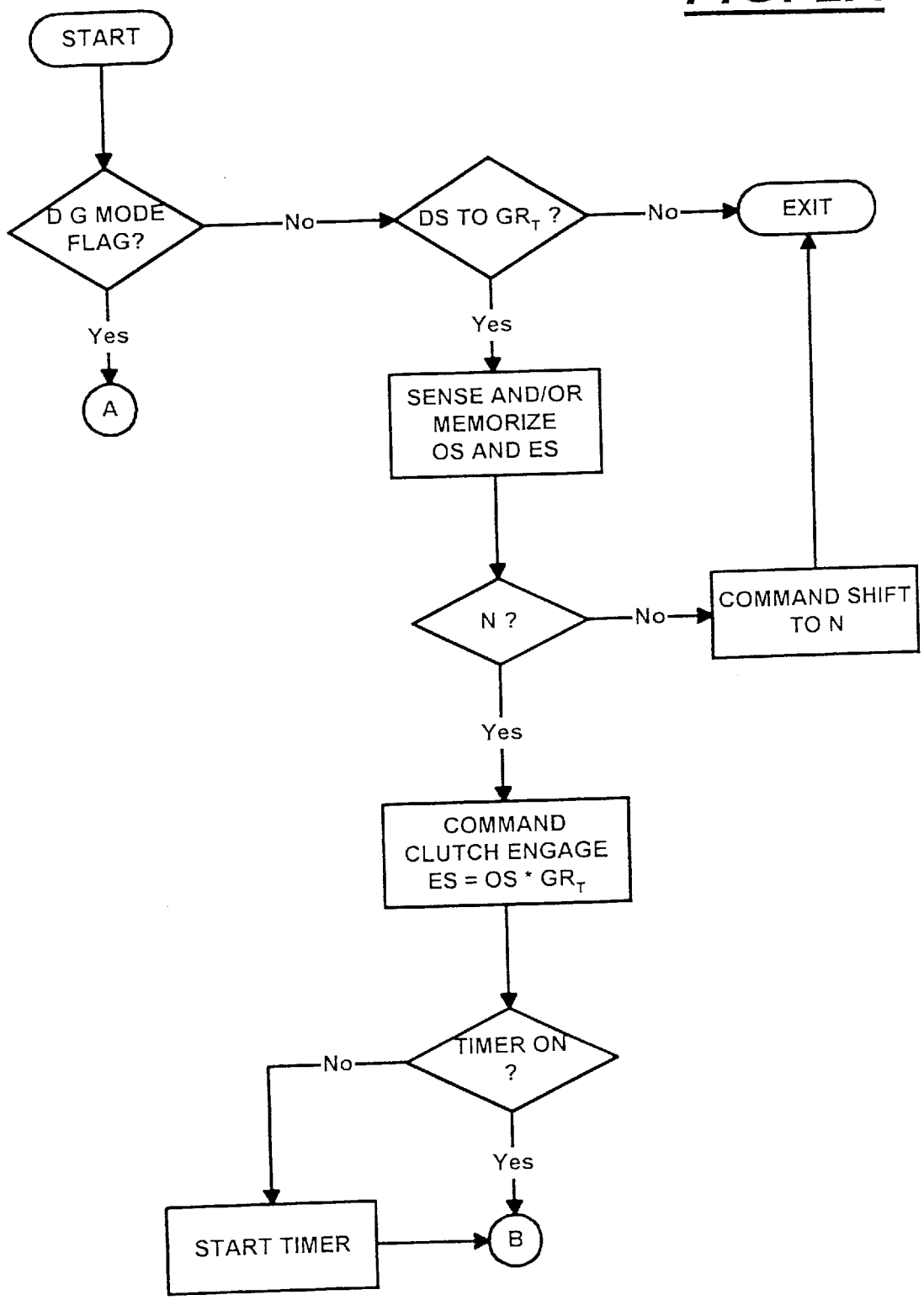
FIGS. 2A and 2B are schematic illustrations, in flowchart format, of the control system/method of the present invention.
Figure 2B:
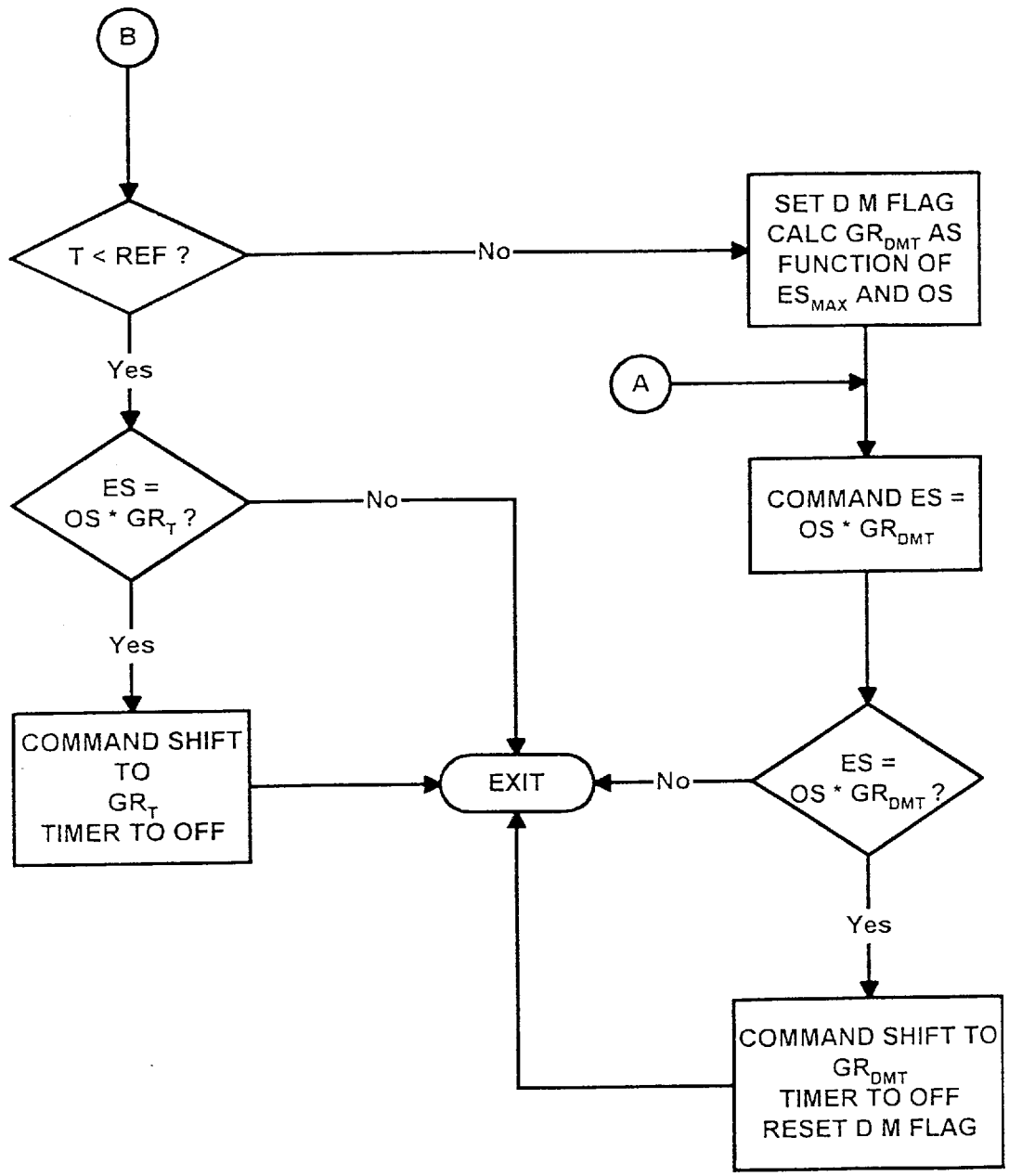

FIG. 2 is a schematic illustration, in flow chart format, of the control logic utilized by the control method and system of the present invention. Briefly, at initiation of an attempted downshift into a target gear ratio, the transmission is caused to assume a neutral condition, the master clutch is caused to engage, the engine is commanded to a synchronous speed for downshifting into the target gear ratio, and a timing sequence is initiated. If prior to expiration of a predetermined reference period of time, such as about 2.0 seconds, the engine speed achieves a substantially synchronous value, the transmission actuator is commanded to cause engagement of the jaw clutches associated with the target gear ratio and the timer is reset to zero and turned off. If, however, the period of time expires prior to the engine accelerating to the required engine speed for synchronous engagement of the target gear ratio, a degraded mode of operation is declared and a degraded mode downshift target gear ratio ($GR_{DMT}$) is determined as a function of the maximum sensed engine speed and current output shaft speed. The engine is then commanded to the synchronous speed for engaging the degraded mode target gear ratio and, upon achieving the synchronous speed, the transmission actuator is caused to engage the degraded mode target gear ratio.

Accordingly, it may be seen that a new and improved downshift control for a fully or partially automated vehicular transmission system is provided which will sense conditions indicative of an inability to synchronize for a selected downshift target gear ratio and, in such circumstances, will enter into a degraded mode of operation wherein the best available downshift target ratio in view of achievable engine speed will be engaged.

Although the present invention has been described with a certain degree of particularity, it is understood that various modifications are possible without departing from the spirit and scope of the invention as hereinafter claimed.

We claim:

1. A method for downshifting an automated mechanical transmission system including a mechanical transmission and a vehicle master clutch, said method comprising:

sensing selection of a downshift from a currently engaged ratio into a target gear ratio ($GR_T$);

causing the transmission to be shifted into neutral;

causing the vehicle master clutch to be engaged;

sensing engine speed (ES) and output shaft speed (OS) and memorizing at least a value for maximum sensed engine speed ($ES_{MAX}$);

commanding engine speed to equal a synchronous engine speed for engaging the target gear ratio (ES=OS*$GR_T$);

said method characterized by:

initiating a timing sequence; and if after a predetermined period of time (T>REF) sensed engine speed remains less than said synchronous engine speed for engaging said target gear ratio, automatically operating in a degraded mode of operation including determining a degraded mode target gear ratio ($GR_{DMT}$) as a ratio for which the maximum sensed engine speed ($ES_{MAX}$) will equal or exceed a synchronous engine speed at current output shaft speed ($ES_{MAX} \geq OS*GR_{DMT}$).

2. The method of claim 1 wherein said degraded mode target gear ratio is a lowest ratio for which the maximum sensed engine speed ($ES_{MAX}$) will equal or exceed the synchronous engine speed at current output shaft speed ($ES_{MAX} \geq OS*GR_{DMT}$).

3. The method of claim 1 wherein said degraded mode of operation further comprises, after sensing engine speed substantially equaling synchronous speed for engaging said degraded mode target gear ratio, causing engagement of said degraded mode target gear ratio.

4. The method of claim 1 wherein said predetermined period of time equals about 2.0 seconds.

5. A machine for controlling downshifting of a vehicular automated mechanical transmission system (10) comprising a mulitple-speed mechanical transmission (12) having a plurality of selectable gear ratios (GR), an input shaft (26) drivingly connected to a fuel-controlled engine (14) by a vehicle master clutch (16) and an output shaft (18) for driving connection to vehicular drivewheels, a transmission actuator (46) for controlling shifting of said transmission, and an engine actuator (38) for controlling fueling of said engine, said machine comprising:

(1) input signal receiving means (54A) for receiving input signals including input signals indicative of engine speed (ES) and output shaft speed (OS);

(2) data processing means (54) for processing said input signals according to predetermined logic rules to issue command output signals to system actuators including said transmission actuator and said engine actuator, said data processing means including logic rules for:

(a) causing the transmission to be shifted into neutral;

(b) sensing selection of a downshift from a currently engaged ratio into a target gear ratio ($GR_T$);

(c) causing the vehicle master clutch to be engaged;

(d) sensing engine speed (ES) and output shaft speed (OS) and memorizing at least a value for maximum sensed engine speed ($ES_{MAX}$);

(e) commanding engine speed to equal a synchronous engine speed for engaging the target gear ratio (ES=OS*$GR_T$);

(f) initiating a timing sequence; and (g) if, after a predetermined period of time (T>REF), sensed engine speed remains less than said synchronous engine speed for engaging said target gear ratio, automatically causing operation in a degraded mode of operation, including determining a degraded mode target gear ratio ($GR_{DMT}$) as a ratio for which the maximum sensed engine speed ($ES_{MAX}$) will equal or exceed a synchronous engine speed at current output shaft speed ($ES_{MAX} \geq OS*GR_{DMT}$); and (3) output signal issuing means (54B) for issuing command output signals to system actuators, including said transmission actuator and said engine actuator.

6. The machine of claim 5 wherein said degraded mode target gear ratio is a lowest ratio for which the maximum sensed engine speed will equal or exceed the synchronous engine speed at current output shaft speed.

7. The machine of claim 6 wherein said data processing means further includes logic rules for, after sensing engine speed substantially equaling synchronous speed for engaging said degraded mode target gear ratio, causing engagement of said degraded mode target gear ratio.

8. The machine of claim 5 wherein said predetermined period of time equals about 2.0 seconds.

* * * * *